United States Patent Office 3,174,993

Patented Mar. 23, 1965

3,174,993

PREPARATION OF TETRACYANOETHYLENE BY OXIDATION OF TETRACYANOETHYLENIDES WITH SELECTED OXIDIZING AGENTS

Owen W. Webster, Wilmington, Del., assignor to E. I. du Pont de Nemours and Company, Wilmington, Del., a corporation of Delaware No Drawing. Filed Dec. 29, 1961, Ser. No. 163,076
5 Claims. (Cl. 260—465.8)

This invention is concerned with, and has as its principal object, the provision of a novel process for oxidizing tetracyanoethylenides.

This application is a continuation-in-part of application, U.S. Serial No. 58,634, filed September 27, 1960, now abandoned.

The discovery of tetracyanoethylene has opened up the field of cyanocarbon chemistry and has made possible many interesting subsequent discoveries. For example, it has been found that tetracyanoethylene is converted to the corresponding tetracyanoethylenide

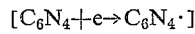

$$[C_6N_4+e \rightarrow C_6N_4\cdot]$$

when coupled with a reducing species having a half-wave potential more negative than +0.15 volt when measured at a dropping mercury electrode in acetonitrile containing 0.1 M $LiClO_4$ against the aqueous saturated calomel electrode. It has also been found that tetracyanoethylenides are converted to the corresponding pentacyanopropenides by the action of molecular oxygen and to tetracyanoethylene oxide by the action of hydroperoxides.

It has now been discovered that the tetracyanoethylenides are converted to tetracyanoethylene when coupled with an oxidizing agent (other than molecular oxygen or a hydroperoxide, which oxidizing agents are excluded from the process of this invention for the reasons stated in the last sentence of the preceding paragraph) such as bromine, silver trifluoroacetate, chlorine, nitric acid, potassium permanganate, sodium dichromate, ferric chloride, potassium ferricyanide, sulfur dichloride, and other equivalent oxidizing agents, examples of which will be disclosed later in this specification.

By completing the cycle from tetracyanoethylene to tetracyanoethylenide ion and back to tetracyanoethylene, the process of this invention makes it possible to separate tetracyanoethylene from water-insoluble impurities, such as sulfur and tar-like residues, which are often present in tetracyanoethylene when it is prepared by the reaction of sulfur monochloride with malononitrile. Thus, crude tetracyanoethylene may be converted to a water-soluble tetracyanoethylenide, such as the sodium, potassium, ammonium, etc., salt and the product thereof mixed with water. Filtering the resulting water solution removes water-insoluble organic impurities. Treatment of the filtrate with an oxidant as described above regenerates tetracyanoethylene in purified form. The process of this invention also simplifies inventory problems connected with supplying tetracyanoethylene and tetracyanoethylenide ion compounds commercially. The ready conversion from tetracyanoethylenide ion to tetracyanoethylene, coupled with the known methods for converting tetracyanoethylene to tetracyanoethylenide ion, makes it possible to supply either form quickly from a common source of either tetracyanoethylene or one of the tetracyanoethylenides.

To facilitate isolation of tetracyanoethylene in optimum yields in the process of this invention, there are preferred those particular oxidizing agents as defined above whose reduced species are also inert to, i.e., are nonreactive with, tetracyanoethylene.

The process of this invention may be carried out under a wide variety of conditions. The reaction conditions are not restrictive since it suffices to bring a tetracyanoethylenide and an oxidizing agent, as defined above, into intimate contact for sufficient time to convert a substantial portion of the tetracyanoethylenide to tetracyanoethylene. Thus, gaseous chlorine may be passed through a bed of finely powdered solid potassium tetracyanoethylenide until the tetracyanoethylenide is converted to tetracyanoethylene and potassium chloride.

It is convenient to carry out the process of this invention at room temperature, but temperatures far below and far above room temperature are also operable. Temperatures ranging up to the decomposition temperature of the reactants or products, whichever is lower, may be employed. In general, temperatures from −100° C. to +250° C. are preferred and particularly temperatures in the range of −100 to +200° C.

Pressure is not a critical factor in the process of this invention, and pressures both below and above atmospheric pressure may be employed. Since the presence of molecular oxygen in any atmosphere which is in contact with the reactants of this invention leads to a low yield of tetracyanoethylene through formation of by-product pentacyanopropenides, it is preferred to carry out the process of this invention in the substantial absence of molecular oxygen. In most of the examples below, the substantial absence of oxygen is obtained by blanketing the reaction with nitrogen. Reduced access of oxygen may also be obtained by employing other inert gases, such as helium, argon, and the like, by operating under reduced pressure or by other means known in the art.

No reaction medium is required for carrying out the process of this invention, but the use of a liquid diluent which is inert to the reactants and products is often convenient. Suitable diluents include water, acetonitrile, ethers such as diethyl ether, tetrahydrofuran, 1,2-dimethoxyethane, and the like.

The molar ratio of the oxidizing agent as defined above to the tetracyanoethylenide which is operable in this invention is not critical, because any time that quantitative amounts of these two components are brought together at least some tetracyanoethylene will form. However, for practical purposes, excesses beyond twentyfold of either component are to be avoided, and molar ratios between 1:1 and 10:1 are preferred.

Tetracyanoethylenides, i.e., compounds containing the $(C_6N_4^-)$ ion-radical which are the starting materials in the process of this invention, are salts. They may be prepared in numerous ways as indicated in the examples below. For example, metal tetracyanoethylenides may be prepared by the direct reaction of tetracyanoethylene with a metal as described in co-assigned application, U.S. Serial No. 12,975, filed March 7, 1960, now abandoned. Onium tetracyanoethylenides, i.e., ammonium (including substituted ammonium) and sulfonium tetracyanoethylenides, may be prepared by the direct reaction of a mixture of tetracyanoethylene and tetracyanoethane with, e.g., ammonia, an amine or a thioether, as disclosed in co-assigned application, U.S. Serial No. 57,152, filed September 20, 1960.

The preferred tetracyanoethylenides are the alkali metal, alkaline earth metal, and ammonium (particularly lower alkyl-substituted ammonium) tetracyanoethylenides.

In the following examples parts are by weight unless otherwise indicated. Example III represents a preferred embodiment of the invention.

EXAMPLE I

*Part A*

To a suspension of 55 parts of sodium cyanide in 3,914 parts of carefully dried acetonitrile in a system blanketed with nitrogen is added a solution of 145 parts of tetracyanoethylene in 7,045 parts of acetonitrile. Within a few minutes the solution turns dark purplish-brown in color and after 15 minutes is poured into 3,568 parts of diethyl ether. Sodium tetracyanoethylenide precipitates as a brown solid and is collected by filtration. The yield is 75 parts.

*Part B*

To a suspension of 10 parts of sodium tetracyanoethylenide in 78.3 parts of acetonitrile is added 1.56 parts of bromine. After about ten minutes at room temperature, the solvent is evaporated under reduced pressure. The residue (containing tetracyanoethylene and sodium bromide) is sublimed by heating under reduced pressure. The product is 0.46 part of purified crystalline tetracyanoethylene melting at 200–201° C.

EXAMPLE II

To a solution of 13.51 parts of sodium tetracyanoethylenide in 436 parts of 1,2-dimethoxyethane is added 30 parts of silver trifluoroacetate in 436 parts of dry 1,2-dimethoxyethane. The solution is stirred 15 minutes at room temperature, after which the solvent is removed by evaporation. The solid residue is heated at 80° C./0.3 mm. to obtain by sublimation 6.28 parts of white crystalline tetracyanoethylene.

EXAMPLE III

*Part A*

A mixture of 300 parts of dry potassium iodide and 170 parts of tetracyanoethylene is placed in a glass reactor. The system is evacuated and then filled with nitrogen. About 3,920 parts of acetonitrile are added, and the resulting suspension is agitated for four hours at room temperature. Filtration yields 114 parts of potassium tetracyanoethylenide in the form of bronze-colored crystals.

*Part B*

Into a system containing 18 parts of potassium tetracyanoethylenide in 235 parts of acetonitrile at −80° C. about 4.1 parts of gaseous chloride are introduced. The system is agitated and allowed to warm to room temperature spontaneously. The solvent is then removed by evaporation and the solid residue is heated at 100° C./0.3 mm. to obtain by sublimation 11.5 parts of tetracyanoethylene.

EXAMPLE IV

A mixture of 10 parts of potassium tetracyanoethylenide and 42.6 parts of concentrated nitric acid is stirred for one minute. It is then diluted with 150 parts of ice water, and the solid residue is recovered by filtration. The dried product (5.6 parts) is identified as tetracyanoethylene by its infrared absorption spectrum.

When a tetracyanoethylenide is treated with an aqueous solution of a strong acid, for example, a dilute mineral acid in which the dilution is sufficient to reduce substantially any strong oxidizing action the acid may possess, direct conversion of the tetracyanoethylenide to tetracyanoethylene does not occur, but instead the tetracyanoethylenide disproportionates to tetracyanoethylene and tetracyanoethane. For example, when 10 parts of potassium tetracyanoethylenide and 111 parts of 6 N hydrochloric acid are mixed together for one minute, there remains after filtering and drying 6.3 parts of a solid residue which is shown to be an equimolar mixture of tetracyanoethylene and tetracyanoethane by comparison of its infrared absorption spectrum with that of an authentic equimolar mixture of these two compounds. In Examples V–VIII, which follow, tetracyanoethylenides are oxidized in the presence of an aqueous strong acid, i.e., at a pH below 7. Under these conditions both the direct oxidation of tetracyanoethylenide to tetracyanoethylene by the oxidant and disproportionation to tetracyanoethylene and tetracyanoethane by the aqueous acid occur. The respective amounts of the two processes which occur are readily calculated from the molecular excess of tetracyanoethylene over tetracyanoethane in the product, this being the portion of the product formed by oxidation of tetracyanoethylenide ion according to the present invention.

EXAMPLE V

To a solution of one part of potassium permanganate in 103.3 parts of 1 N sulfuric acid is added five parts of potassium tetracyanoethylenide. The slurry is stirred for five minutes at room temperature. The solid residue is collected by filtration and dried to yield 2.9 parts of a mixture which is approximately two-thirds tetracyanoethylene and one-third tetracyanoethane. Thus, approximately one part of the product is tetracyanoethylene produced by oxidation of potassium tetracyanoethylenide by potassium permanganate.

EXAMPLE VI

To a solution of 1.5 parts of sodium dichromate, $Na_2Cr_2O_7.2H_2O$, in 103.3 parts of 1 N sulfuric acid is added five parts of potassium tetracyanoethylenide. The mixture is stirred for three minutes at room temperature. The solid residue is collected by filtration and dried to yield 2.7 parts of an 80:20 mixture of tetracyanoethylene and tetracyanoethane (as determined by infrared absorption analysis). Thus, approximately 60% of the product is tetracyanoethylene produced by dichromate oxidation of potassium tetracyanoethylenide.

EXAMPLE VII

A solution is prepared by dissolving 8.1 parts of $FeCl_3.6H_2O$ in 100 parts of water. This solution is acidic. Five parts of potassium tetracyanoethylenide is added, and the mixture is stirred for three minutes at room temperature. The solid residue is collected by filtration and dried to yield 2.9 parts of a mixture containing some unreacted tetracyanoethylenide along with tetracyanoethylene and tetracyanoethane in approximately a 70:30 ratio.

EXAMPLE VIII

The procedure of Example VII is repeated using 9.8 parts of $K_3Fe(CN)_6$ in place of the ferric chloride. The product is three parts of a mixture containing some unreacted tetracyanoethylenide along with tetracyanoethylene and tetracyanoethane in a 60:40 ratio.

EXAMPLE IX

In a system blanketed with nitrogen a suspension of 50 parts of potassium tetracyanoethylenide in 235 parts of acetonitrile is cooled to −40° C. and 16.2 parts of freshly distilled sulfur dichloride is added. The solution turns light tan in color and a white precipitate forms. The reaction mixture is allowed to warm to room temperature over a period of three hours and is then filtered. The filtrate is evaporated to dryness under reduced pressure to obtain 39 parts of tetracyanoethylene which is identified by its infrared absorption spectrum.

Other oxidizing agents which are equivalent to and can be substituted for the oxidizing agents in Examples I–IX include the following:

| | |
|---|---|
| Chloranil | $HBrO_3$ |
| $H_3AsO_4$ | $PbO_2$ |
| $H_2SeO_3$ | $HClO_3$ |
| $H_3SbO_4$ | $HClO_4$ |
| $Hg(NO_3)_2$ | $H_2S_2O_8$ |
| $HNO_2$ | $HBiO_3$ |
| $CoO_2$ | $NiO_2$ |
| HClO | $CoCl_3$ |
| $OsO_4$ | $N_2O$ |
| $HIO_3$ | NOCl |
| $HVO_3$ | $SOCl_2$ |
| $Ce(SO_4)_2$ | $SO_2Cl_2$ |
| $H_2SeO_4$ | $S_2Cl_2$ |
| $H_2PdCl_6$ | $SCl_2$ |
| $MnO_2$ | $COCl_2$ |
| $AuNO_3$ | $SeO_2$ |
| $HIO_4$ | |

Salts of tetracyanoethylene which are equivalent to and may be substituted for sodium or potassium tetracyanoethylenide in the processes of Examples I–IX include calcium, barium, ammonium, tetramethylammonium, and trimethylsulfonium tetracyanoethylenides, as well as the other alkali metal, alkaline earth metal, lower alkylammonium and lower alkylsulfonium salts of tetracyanoethylene which can be prepared by the processes described in the aforesaid co-assigned applications, S.N. 12,975 and S.N. 57,152.

Since obvious modifications and equivalents in the invention will be evident to those skilled in the chemical arts, I propose to be bound solely by the appended claims.

The embodiments of the invention in which an exclusive property or privilege is claimed are defined as follows:

1. Process of preparing tetracyanoethylene which comprises contacting, at a temperature from −100° C. to 250° C., a tetracyanoethylenide selected from the group consisting of alkali metal, alkaline earth metal, ammonium, lower alkylammonium, and lower alkylsulfonium tetracyanoethylenides with an oxidizing agent selected from the group consisting of bromine, silver trifluoroacetate, chlorine, nitric acid, potassium permanganate, sodium dichromate, ferric chloride, potassium ferricyanide, sulfur dichloride, chloranil, $H_3AsO_4$, $H_2SeO_3$, $H_3SbO_4$, $Hg(NO_3)_2$, $HNO_2$, $CoO_2$, $HClO$, $OsO_4$, $HIO_3$, $HVO_3$, $Ce(SO_4)_2$, $H_2SeO_4$, $H_2PdCl_6$, $MnO_2$, $AuNO_3$, $HIO_4$, $HBrO_3$, $PbO_2$, $HClO_3$, $HClO_4$, $H_2S_2O_8$, $HBiO_3$, $NiO_2$, $CoCl_3$, $N_2O$, $NOCl$, $SOCl_2$, $SO_2Cl_2$, $S_2Cl_2$, $COCl_2$, and $SEO_2$.

2. The process of claim 1 conducted at a pH below 7.

3. The process of claim 1 conducted in an atmosphere substantially free of molecular oxygen.

4. The process of claim 1 wherein the tetracyanoethylenide is an alkali metal tetracyanoethylenide.

5. In a process for purifying tetracyanoethylene wherein tetracyanoethylene containing water-insoluble material is converted to a tetracyanoethylenide selected from the group consisting of alkali metal, alkaline earth metal, ammonium, lower alkylammonium, and lower alkylsulfonium tetracyanoethylenides, the steps which comprise (*a*) dissolving said tetracyanoethylenide in water, (*b*) removing said water-insoluble material from the resultant solution, (*c*) contacting, at a temperature from −100° C. to 250° C., said tetracyanoethylenide with an oxidizing agent selected from the group consisting of bromine, silver trifluoroacetate, chlorine, nitric acid, potassium permanganate, sodium dichromate, ferric chloride, potassium ferricyanide, sulfur dichloride, chloranil, $H_3AsO_4$, $H_2SeO_3$, $H_3SbO_4$, $Hg(NO_3)_2$, $HNO_2$, $CoO_2$, $HClO$, $OsO_4$, $HIO_3$, $HVO_3$, $Ce(SO_4)_2$, $H_2SeO_4$, $H_2PdCl_6$, $MnO_2$, $AuNO_3$, $HIO_4$, $HBrO_3$, $PbO_2$, $HClO_3$, $HClO_4$, $H_2S_2O_8$, $HBiO_3$, $NiO_2$, $CoCl_3$, $N_2O$, $NOCl$, $SOCl_2$, $SO_2Cl_2$, $S_2Cl_2$, $COCl_2$, and $SeO_2$ and (*d*) recovering the resultant tetracyanoethylene.

No references cited.

UNITED STATES PATENT OFFICE

CERTIFICATE OF CORRECTION

Patent No. 3,174,993 March 23, 1965

Owen W. Webster

It is hereby certified that error appears in the above numbered patent requiring correction and that the said Letters Patent should read as corrected below.

Column 2, line 45, for "($C_6N_4$-)" read -- ($C_6N_4$$\dot{-}$) --; column 3, line 31, for "are" read -- is --; line 39, for "chloride" read -- chlorine --; column 6, line 2, for "$SEO_2$" read -- $SeO_2$ --.

Signed and sealed this 17th day of August 1965.

(SEAL)
Attest:

ERNEST W. SWIDER
Attesting Officer

EDWARD J. BRENNER
Commissioner of Patents